US012693161B2

(12) United States Patent
Kawasaki

(10) Patent No.: US 12,693,161 B2
(45) Date of Patent: Jul. 28, 2026

(54) OPTICAL CHARACTERISTIC MEASURING APPARATUS, WAVELENGTH SHIFT CORRECTING APPARATUS, WAVELENGTH SHIFT CORRECTION METHOD, AND PROGRAM

(71) Applicant: Konica Minolta, Inc., Tokyo (JP)

(72) Inventor: Takashi Kawasaki, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 152 days.

(21) Appl. No.: 18/272,256

(22) PCT Filed: Jan. 11, 2022

(86) PCT No.: PCT/JP2022/000488
§ 371 (c)(1),
(2) Date: Jul. 13, 2023

(87) PCT Pub. No.: WO2022/153963
PCT Pub. Date: Jul. 21, 2022

(65) Prior Publication Data
US 2024/0068870 A1 Feb. 29, 2024

(30) Foreign Application Priority Data
Jan. 15, 2021 (JP) ................................. 2021-004965

(51) Int. Cl.
*G01J 3/28* (2006.01)
*G01J 3/18* (2006.01)

(52) U.S. Cl.
CPC ............... *G01J 3/2823* (2013.01); *G01J 3/18* (2013.01); *G01J 3/2803* (2013.01); *G01J 2003/2866* (2013.01)

(58) Field of Classification Search
CPC ..... G01J 3/2823; G01J 3/18; G01J 2003/2866
See application file for complete search history.

(56) References Cited

U.S. PATENT DOCUMENTS

2008/0297796 A1* 12/2008 Lukas ....................... G01J 3/28
356/326

FOREIGN PATENT DOCUMENTS

JP 2000205955 A * 7/2000
WO 2017018142 A1 2/2017
WO 2019039024 A1 2/2019

OTHER PUBLICATIONS

Machine translation of Imura (Foreign Patent Document JP 2000205955 A) (Year: 2000).*

(Continued)

*Primary Examiner* — Tarifur R Chowdhury
*Assistant Examiner* — Paul Schnase
(74) *Attorney, Agent, or Firm* — CANTOR COLBURN LLP

(57) ABSTRACT

A wavelength of incident light is measured based on signals from a plurality of pixels of a photoelectric conversion element that are arranged in a dispersion direction in which the incident light is dispersed by a spectroscopic section. In correction of a shift in wavelength, a measured amount of shift in wavelength that is a difference between a measured value obtained when an emission line wavelength of incident light from a light source for wavelength shift correction that emits light including an emission line at least one wavelength in a range of wavelengths into which light can be dispersed by the spectroscopic section is measured and an original emission line wavelength is calculated.

9 Claims, 4 Drawing Sheets

(56)          References Cited

OTHER PUBLICATIONS

Wikipedia article. "Polynomial regression". Archived Jun. 12, 2019. (Year: 2019).*
John A. Holy, "Determination of Spectrometer-Detector Parameters from Calibration Spectra and the Use of the Parameters in Spectrometer Calibrations," Appl. Spectrosc. 58, 1219-1227 (Year: 2004).*
International Search Report for International Application No. PCT/JP2022/000488; Date of Mailing, of Mar. 8, 2022.

* cited by examiner

Light path when Ne lamp light with emission line is incident

Spectrum of Ne lamp

Output upon measurement of Ne lamp

Output when Ne lamp is measured

Shifts in wavelength due to changes in optical components

Pixel number

OPTICAL CHARACTERISTIC MEASURING APPARATUS, WAVELENGTH SHIFT CORRECTING APPARATUS, WAVELENGTH SHIFT CORRECTION METHOD, AND PROGRAM

CROSS REFERENCE TO RELATED APPLICATIONS

This is the U.S. national stage of application No. PCT/JP2022/000488, filed on Jan. 11, 2022. Priority under 35 U.S.C. § 119(a) and 35 U.S.C. § 365(b) is claimed from Japanese Application No. 2021-004965, filed Jan. 15, 2021, the disclosure of which is also incorporated herein by reference.

TECHNICAL FIELD

The present invention relates to an optical characteristic measuring apparatus, a wavelength shift correcting apparatus, a wavelength shift correction method, and a program for performing wavelength measurement by spectrally separating incident light, like a spectral colorimeter or a spectral luminance meter.

BACKGROUND ART

In such an optical characteristic measuring apparatus which performs wavelength measurement by spectrally separating incident light as described above, generally, a wavelength is calibrated at the time of shipment from a factory, and measurement is performed using the calibrated wavelength until the wavelength is calibrated again. However, optical components such as a spectroscopic section and a lens provided in the optical characteristic measuring apparatus may cause a change in wavelength to be actually measured due to a change in position of the optical components over time or the like, which results in a measurement error. However, when a measured value of an object to be measured is different from an expected value, a user cannot know whether the difference is caused by misalignment of the optical characteristic measuring apparatus or a difference of the object to be measured. In order to know that it is necessary to send the measuring apparatus to a factory or a service base once and perform wavelength calibration there. However, the user cannot use the optical characteristic measuring apparatus while the optical characteristic measuring apparatus is being used for wavelength calibration.

In order to correct the change in the wavelength, it is necessary to accurately know the amount of shift in the wavelength (the amount of change in the wavelength) over time. Techniques for estimating a wavelength shift of a spectrometer are disclosed in, for example, Patent Literature 1 and Patent Literature 2. The techniques disclosed in Patent Literatures 1 and 2 are a method including: using a light source to emit an emission line at a known emission line wavelength; using a spectroscopic section to disperse incident light according to wavelengths and using a plurality of photoelectric conversion elements arranged in a dispersion direction to receive the dispersed light; estimating a wavelength of an emission line output from a relative output of a light receiver at the emission line wavelength when the spectroscopic section measures emitted light from a light source for wavelength shift correction; and estimating the amount of change in the wavelength from a difference between the estimated wavelength of the emission line output and the known emission line wavelength.

A mercury cadmium lamp or a neon lamp is known as a light source that emits an emission line, and Patent Literature 1 discloses an example of using a mercury cadmium lamp. A mercury cadmium lamp is often used for wavelength calibration of a spectrometer and has a plurality of emission lines in the visible light wavelength range. Therefore, it is possible to estimate a shift in wavelength in the entire visible light wavelength range.

Patent Literature 2 discloses a method of performing wavelength calibration of a spectrometer using an emission line of a neon lamp. Since the neon lamp is a small and inexpensive light source which is often used for an indicator of an electric product and emits light having an emission line, it is possible to estimate a shift in wavelength close to the emission line.

CITATION LIST

Patent Literature

Patent Literature 1: WO 2017/018142 A
Patent Literature 2: WO 2019/039024 A

SUMMARY OF INVENTION

Technical Problem

However, in Patent Literature 1, the mercury cadmium lamp used as a light source for emitting an emission line is useful for wavelength calibration of a spectroscope in a factory but contains light having a wavelength in the ultraviolet range and dangerous when it is directly viewed. In addition, since there is no small-sized lamp light source and a harmful substance is included, it is difficult to simply perform wavelength calibration without carrying into a factory or the like. Therefore, when a shift in wavelength occurs, wavelength calibration at a factory or a service base is also required.

On the other hand, the neon lamp used in Patent Literature 2 does not have such a problem as the mercury cadmium lamp, and can be used as an inexpensive, compact, and safe light source for wavelength calibration. Therefore, in a case where wavelength calibration can be easily performed using a neon lamp, for example, when a measurement error becomes large, a user of an optical characteristic measuring apparatus can estimate the amount of shift in wavelength using an emission line light source without having to send the measuring apparatus back to a factory or a service base, and can confirm whether or not the error is due to misalignment of the optical characteristic measuring apparatus.

Although there are a plurality of emission lines of the neon lamp, there is a problem that an emission line which is independent to some extent and can be used for wavelength estimation is only at a wavelength close to 724 nm, and only the amount of shift in wavelength in a wavelength range close to 724 nm can be estimated. In the method described in Patent Document 2, a shift in wavelength is corrected by applying the amount of shift in wavelength estimated using the emission line wavelength close to 724 nm of the neon lamp to the entire visible light wavelength range.

However, depending on the optical design of the optical characteristic measuring apparatus, it cannot be said that a shift in wavelength caused by a change in position of an optical component over time occurs uniformly in the visible light wavelength range, and the shift in wavelength often depends to some extent on the wavelength. Therefore, although the estimated amount of shift in wavelength close to 724 nm and the amount of shift in wavelength in a shorter-wavelength range are different, since correction is performed with a uniform correction amount, there is a problem that a correction error in the shorter-wavelength range becomes large.

The present invention has been made in view of the above technical background, and it is an object of the present invention to provide an optical characteristic measuring apparatus, a wavelength shift correcting apparatus, a wavelength shift correction method, and a program capable of accurately correcting a shift in wavelength over the entire range of wavelengths into which light can be dispersed by a spectroscopic section even when a light source for correction that has a small number of independent emission line wavelengths, such as a neon lamp, is used.

Solution to Problem

The above-described object is achieved by the following means.

(1) An optical characteristic measuring apparatus including: a spectroscopic means to disperse incident light according to a wavelength; a photoelectric conversion element including a plurality of pixels arranged in a dispersion direction in which the incident light is dispersed by the spectroscopic means, the pixels to receive the dispersed incident light; a measuring means to measure the wavelength of the incident light and a light amount of the incident light based on a signal from each of the pixels of the photoelectric conversion element; a calculating means to, in correction of a shift in wavelength, calculate, as a measured amount of shift in emission line wavelength, a difference between a measured value obtained when the measuring means measures the emission line wavelength of the incident light from a light source for wavelength shift correction that emits the light including an emission line at at least one wavelength in a range of wavelengths into which the light can be dispersed by the spectroscopic means and an original emission line wavelength of the light source for correction; a coefficient determining means to determine each coefficient of a polynomial based on a reference amount of shift in emission line wavelength for the same emission line wavelength as the emission line wavelength of the light source for wavelength shift correction and the measured amount of shift in emission line wavelength calculated by the calculating means, the polynomial being a first or higher order polynomial that has a variable indicating the wavelength or a parameter relating to the wavelength and represents a characteristic of a shift in wavelength that occurs in the range of wavelengths into which the light can be dispersed by the spectroscopic means, the reference amount of shift in emission line wavelength being obtained using the polynomial; and a correcting means to obtain a wavelength shift correction amount by the polynomial, each coefficient of which is determined by the coefficient determining means, and correct the wavelength of the incident light measured by the measuring means with the wavelength shift correction amount.

(2) The optical characteristic measuring apparatus as recited in the aforementioned Item 1, wherein each coefficient of the polynomial determined by the coefficient determining means is represented by a linear function of the measured amount of shift in emission line wavelength.

(3) The optical characteristic measuring apparatus as recited in the aforementioned Item 1 or 2, wherein the polynomial is a cubic polynomial.

(4) The optical characteristic measuring apparatus as recited in any one of the aforementioned Items 1 to 3, further including the light source for wavelength shift correction.

(5) A wavelength shift correcting apparatus including: an obtaining means to, in correction of a shift in wavelength, obtain a measured value from an optical characteristic measuring apparatus including: a spectroscopic means to disperse incident light according to a wavelength; a photoelectric conversion element including a plurality of pixels arranged in a dispersion direction in which the incident light is dispersed by the spectroscopic means, the pixels to receive the dispersed incident light; and a measuring means to measure the wavelength of the incident light and a light amount of the incident light based on a signal from each of the pixels of the photoelectric conversion element, the measured value being obtained when the measuring means measures an emission line wavelength of the incident light from a light source for wavelength shift correction that emits the light including an emission line at at least one wavelength in a range of wavelengths into which the light can be dispersed by the spectroscopic means; a calculating means to calculate, as a measured amount of shift in emission line wavelength, a difference between the measured value obtained by the obtaining means and an original emission line wavelength of the light source for correction; and a coefficient determining means to determine each coefficient of a polynomial based on a reference amount of shift in emission line wavelength for the same emission line wavelength as the emission line wavelength of the light source for wavelength shift correction and the measured amount of shift in emission line wavelength calculated by the calculating means, the polynomial being a first or higher order polynomial that has a variable indicating the wavelength or a parameter relating to the wavelength and represents a characteristic of a shift in wavelength that occurs in the range of wavelengths into which the light can be dispersed by the spectroscopic means, the reference amount of shift in emission line wavelength being obtained using the polynomial, wherein the wavelength of the incident light measured by the measuring means is corrected with a wavelength shift correction amount determined by the polynomial, each coefficient of which is determined by the coefficient determining means.

(6) The wavelength shift correcting apparatus as recited in the aforementioned Item 5, wherein each coefficient of the polynomial determined by the coefficient determining means is represented by a linear function of the measured amount of shift in emission line wavelength.

(7) The wavelength shift correcting apparatus as recited in the aforementioned Item 5 or 6, wherein the polynomial is a cubic polynomial.

(8) A wavelength shift correction method including: a measuring step of measuring a wavelength and a light amount of incident light based on signals from a plurality of pixels of a photoelectric conversion element, the pixels being arranged in a dispersion direction in which the wavelength of the incident light is dispersed by a spectroscopic means, the pixels to receive the dispersed incident light; a calculating step of, in correction of a shift in wavelength, calculating, as a measured amount of shift in emission line wavelength, a difference between a measured value obtained when the measuring step measures the emission line wavelength of the incident light from a light source for wavelength shift correction that emits the light including an emission line at at least one wavelength in a range of wavelengths into which the light can be dispersed by the spectroscopic means and an original emission line wavelength of the light source for correction; a coefficient determining step of determining each coefficient of a polynomial based on a reference amount of shift in emission line wavelength for the same emission line wavelength as the emission line wavelength of the light source for wavelength shift correction and the measured amount of shift in emission line wavelength calculated in the calculating step, the polynomial being a first or higher order polynomial that has a variable indicating the wavelength or a parameter relating to the wavelength and represents a characteristic of a shift in wavelength that occurs in the range of wavelengths into which the light can be dispersed by the spectroscopic means, the reference amount of shift in emission line wavelength being obtained using the polynomial; and a correcting step of obtaining a wavelength shift correction amount by the polynomial, each coefficient of which is determined in the coefficient determining step, and correcting the wavelength of the incident light measured in the measuring step with the wavelength shift correction amount.

(9) The wavelength shift correction method as recited in the aforementioned Item 8, wherein each coefficient of the polynomial determined in the coefficient determining step is represented by a linear function of the measured amount of shift in emission line wavelength.

(10) The wavelength shift correction method as recited in the aforementioned Item 8 or 9, wherein the polynomial is a cubic polynomial.

(11) A program for causing a computer to execute: an obtaining step of, in correction of a shift in wavelength, obtaining a measured value from an optical characteristic measuring apparatus including: a spectroscopic means to disperse incident light according to a wavelength; a photoelectric conversion element including a plurality of pixels arranged in a dispersion direction in which the incident light is dispersed by the spectroscopic means, the pixels to receive the dispersed incident light; and a measuring means to measure the wavelength of the incident light and a light amount of the incident light based on a signal from each of the pixels of the photoelectric conversion element, the measured value being obtained when the measuring means measures an emission line wavelength of the incident light from a light source for wavelength shift correction that emits the light including an emission line at at least one wavelength in a range of wavelengths into which the light can be dispersed by the spectroscopic means; a calculating step of calculating, as a measured amount of shift in emission line wavelength, a difference between the measured value obtained in the obtaining step and an original emission line wavelength of the correction light source; and a coefficient determining step of determining each coefficient of a polynomial based on a reference amount of shift in emission line wavelength for the same emission line wavelength as the emission line wavelength of the light source for wavelength shift correction and the measured amount of shift in emission line wavelength calculated in the calculating step, the polynomial being a first or higher order polynomial that has a variable indicating the wavelength or a parameter relating to the wavelength and represents a characteristic of a shift in wavelength that occurs in the range of wavelengths into which the light can be dispersed by the spectroscopic means, the reference amount of shift in emission line wavelength being obtained using the polynomial, wherein the wavelength of the incident light measured in the measuring step is corrected with a wavelength shift correction amount determined by the polynomial, each coefficient of which is determined in the coefficient determining step.

(12) The program as recited in the aforementioned Item 11, wherein each coefficient of the polynomial determined in the coefficient determining step is represented by a linear function of the measured amount of shift in emission line wavelength.

(13) The program as recited in the aforementioned Item 11 or 12, wherein the polynomial is a cubic polynomial.

Advantageous Effects of Invention

According to the inventions as recited in the aforementioned Items (1), (5), (8), and (11), the wavelength of the incident light is measured based on the signals from the plurality of pixels of the photoelectric conversion element that are arranged in the dispersion direction in which the incident light is dispersed by the spectroscopic means. In the correction of a shift in wavelength, the difference between the measured value when the emission line wavelength of the incident light from the light source for wavelength shift correction that emits light including an emission line at at least one wavelength in the range of wavelengths into which light can be dispersed by the spectroscopic means is measured and the original emission line wavelength of the light source for correction is calculated as the measured amount of shift in emission line wavelength. Meanwhile, each coefficient of the polynomial is determined based on the reference amount of shift in emission line wavelength for the same emission line wavelength as that of the light source for wavelength shift correction and the calculated measured amount of shift in wavelength. The polynomial is a first or higher order polynomial that has a variable indicating the wavelength or a parameter relating to the wavelength and represents a characteristic of a shift in wavelength that occurs in the range of wavelengths into which light can be dispersed by the spectroscopic means, and the reference amount of shift in emission line wavelength is obtained using the polynomial. Then, the wavelength of the incident light is corrected with the wavelength shift correction amount obtained by the polynomial, each coefficient of which has been determined.

That is, the characteristic of the shift in wavelength that occurs in the range of wavelengths into which light can be dispersed by the spectroscopic means is represented by a first or higher order polynomial having a variable indicating the wavelength or a parameter relating to the wavelength, and the correction is performed based on this polynomial. Therefore, even in a case where, for example, a neon lamp is used as the light source for wavelength shift correction, not only a shift in wavelength close to 724 nm, which is the emission line wavelength, but also a shift in wavelength in a shorter-wavelength range can be accurately corrected, and it is possible to correct, with high accuracy, a shift in wavelength over the entire range of wavelengths into which light can be dispersed by the spectroscopic means. In addition, since the measured amount of shift in emission line wavelength and the reference amount of shift in emission line wavelength are obtained from one emission line wavelength of the light source for wavelength shift correction, and each coefficient of the polynomial is determined, even a light source having a small number of independent emission line wavelengths can be used as the light source for wavelength shift correction without any problem.

According to the inventions as recited in the aforementioned Items (2), (6), (9), and (12), each coefficient of the polynomial can be represented by a linear function of the measured amount of shift in emission line wavelength.

According to the inventions as recited in the aforementioned Items (3), (7), (10), and (13), since the polynomial is a cubic polynomial, it is possible to faithfully represent a characteristic of a shift in wavelength that occurs in the range of wavelengths into which light can be dispersed by the spectroscopic means.

According to the invention as recited in the aforementioned Item (4), since the optical characteristic measuring apparatus is provided with the light source for wavelength shift correction, a user can perform an operation for correcting a shift in wavelength without separately preparing the light source for wavelength shift correction.

DESCRIPTION OF EMBODIMENTS

Hereinafter, embodiments of the present invention will be described with reference to the drawings.

Figure 1:
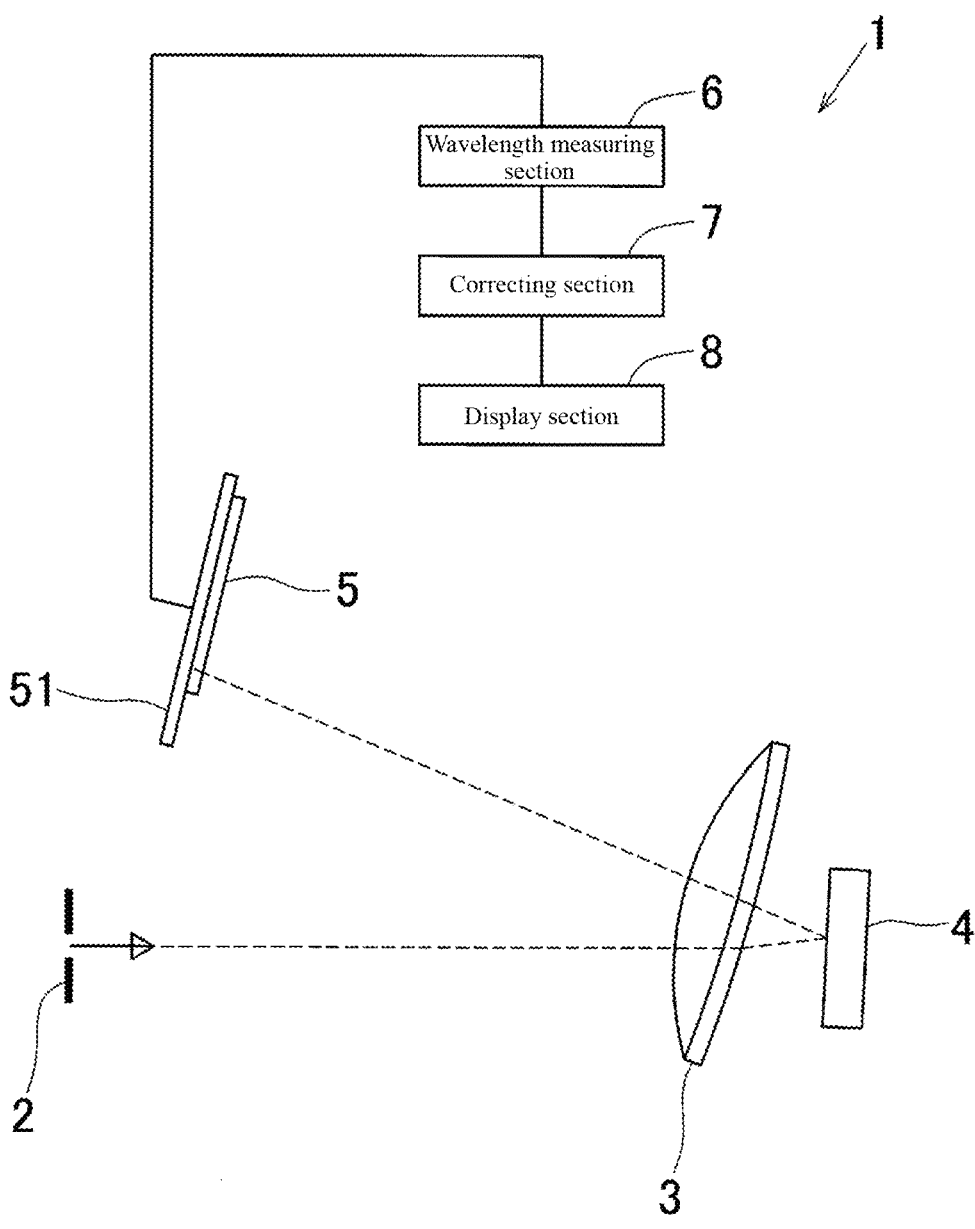
FIG. 1 is a block diagram illustrating an example of a configuration of an optical characteristic measuring apparatus according to an embodiment of the present invention.

FIG. 1 is a block diagram illustrating an example of a configuration of an optical characteristic measuring apparatus according to an embodiment of the present invention.

The optical characteristic measuring apparatus 1 includes an entrance slit 2 through which light from an object to be measured enters, a lens 3, a reflective diffraction grating 4 serving as a spectroscopic section, an image sensor (also simply referred to as a sensor) 5 serving as a photoelectric conversion element, a wavelength measuring section 6, a correcting section 7, and a display section 8.

The light having entered through the entrance slit 2 is incident on the lens 3, converted into substantially parallel light, and incident on the diffraction grating 4. The diffraction grating 4 disperses the light that has entered from the entrance slit 2 and passed through the lens 3 into wavelengths. The incident light is diffracted by the diffraction grating 4 at different angles according to the wavelengths, and then condensed again by the lens 3 to form images at different positions according to the wavelengths on a light receiving surface of the sensor 5.

The sensor 5 includes a plurality of pixels that are arranged in a dispersion direction in which the light is dispersed by the diffraction grating 4, and that receive the dispersed light. The sensor 5 outputs a signal corresponding to the amount of light received by each of the pixels. In this embodiment, the sensor 5 includes 40 pixels arranged along the dispersion direction in which the light is dispersed by the diffraction grating 4, and can measure a distribution of amounts of the light in the dispersion direction. Reference numeral 51 denotes a substrate on which the sensor is mounted.

The wavelength measuring section 6 measures a wavelength (optical spectrum) of the light from the object to be measured, based on received light data in each pixel of the sensor 5.

The correcting section 7 calculates a wavelength shift correction amount in a correction mode and corrects the amount of shift in wavelength measured by the wavelength measuring section 6. A correction method will be described later.

Each of the wavelength measuring section 6 and the correcting section 7 may be formed by a calculating section including a CPU, a ROM in which an operation program for the CPU and the like are stored, a RAM which serves as a work area when the CPU operates in accordance with the operation program, and the like.

The display section 8 displays a result of the measurement by the wavelength measuring section 6. Alternatively, when the shift in wavelength is corrected by the correcting section 7, the display section 8 displays the corrected result of the measurement or the like.

However, due to a change in position of optical components such as the diffraction grating 4, the lens 3, and the sensor 5 over time, the wavelength to be actually measured may change, that is, a shift in wavelength may occur, which causes a measurement error.

Therefore, in this embodiment, the optical characteristic measuring apparatus 1 is provided with a light source for wavelength shift correction that is a neon lamp or the like and emits an emission line at an independent wavelength, so that the shift in wavelength can be corrected in the wavelength shift correction mode.

Figure 2:
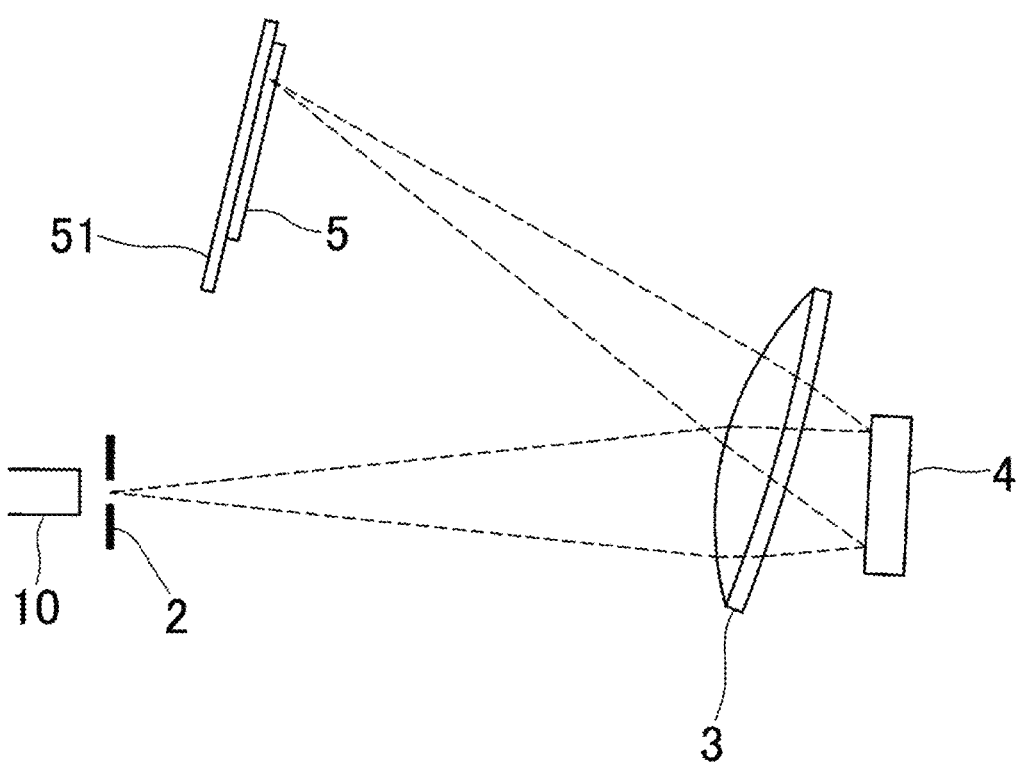
FIG. 2 is a diagram illustrating a light path when light from a neon lamp as a light source for wavelength shift correction is made incident from an entrance slit.
Figure 3:
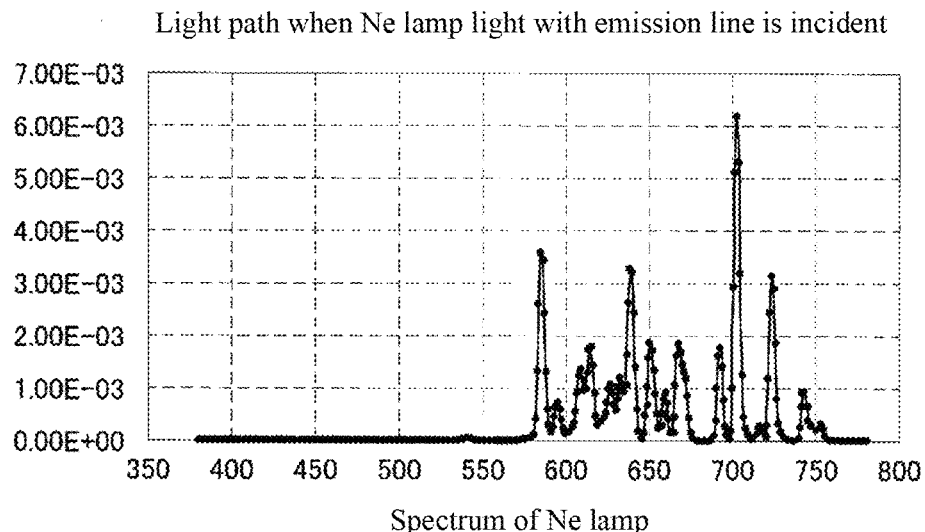
FIG. 3 is a diagram illustrating an example of a spectrum of the neon lamp.

As illustrated in FIG. 2, when light of the neon lamp 10 as the light source for wavelength shift correction source is made incident from the entrance slit 2, an image of the slit is formed at a position corresponding to the emission line wavelength of the neon lamp 10 on the sensor 5. FIG. 3 illustrates an example of a spectrum of the neon lamp (Ne lamp) 10. As described above, the neon lamp 10 has an emission line, which is independent to some extent, can be used for estimating a wavelength, and is close to 724 nm.

Figure 4:
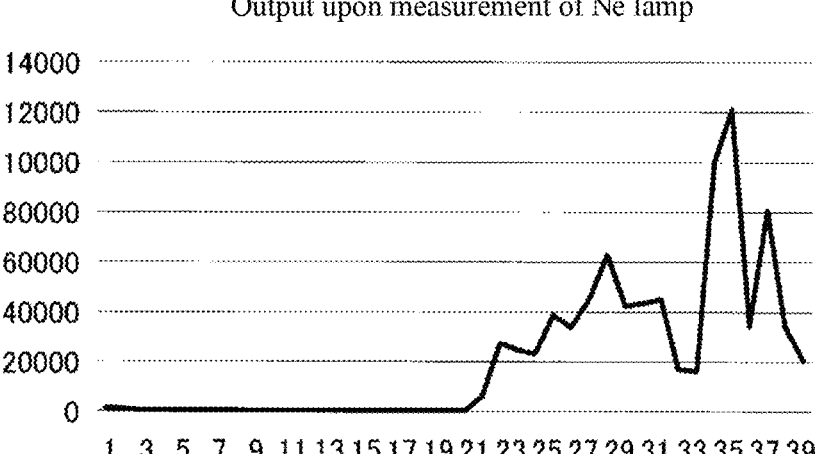
FIG. 4 is a diagram illustrating an example of an output of a photoelectric conversion element when light of the neon lamp is measured.

FIG. 4 illustrates an example of an output of the sensor 5 when the light of the neon lamp 10 is measured. By obtaining the output as illustrated in FIG. 4, it is possible to obtain which pixel of the sensor 5 the emission line of the neon lamp 10 is incident on by the calculation method disclosed in Patent Literature 2. An initial wavelength is acquired at the time of shipment from a factory from the output of the sensor 5 when the light of the neon lamp 10 is made incident, and a wavelength measured at the time of correction measurement is compared with the initial wavelength to obtain the amount of shift in wavelength.

However, although the amount of shift in wavelength close to the emission line wavelength of the neon lamp 10 can be estimated by this method, the amount of shift in wavelength within the measurement range, in other words, over the entire range of wavelengths of light dispersed by the diffraction grating 4 and received by the sensor 5 cannot be obtained.

Therefore, in this embodiment, the following method is adopted so that it is possible to accurately estimate not only the amount of shift in wavelength close to the emission line wavelength of the neon lamp 10 but also the amount of shift in wavelength over the entire range of wavelengths of light dispersed by the diffraction grating 4 and received by the sensor 5.

Correction Example 1

Figure 5:
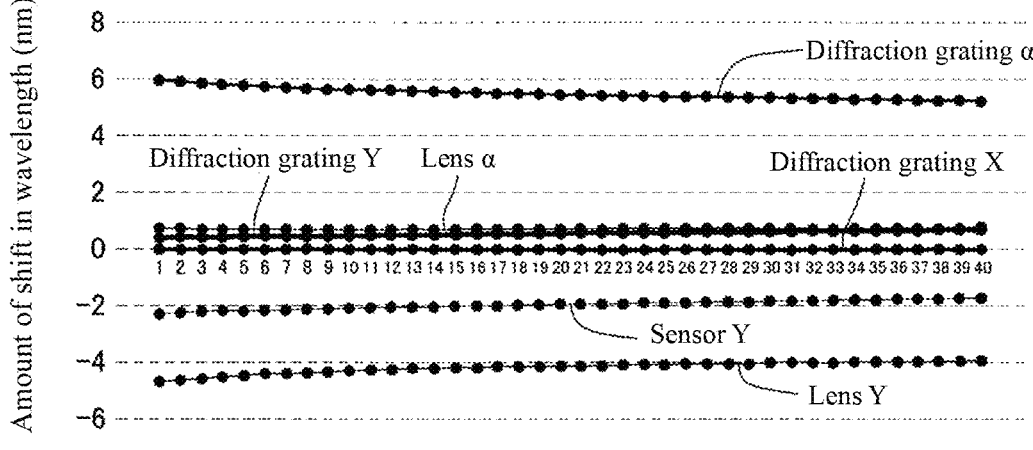
FIG. 5 is a diagram illustrating states of shifts in wavelength due to some optical components obtained by optical simulation.

A shift in wavelength that occurs when the position or inclination of each optical component mounted on the optical characteristic measuring apparatus 1 changes is obtained in advance by optical simulation, an acceleration test, or the like. FIG. 5 illustrates states of shifts in wavelength due to some optical components obtained by the optical simulation. The horizontal axis indicates a pixel number of each of the 40 pixels, and the vertical axis indicates the amount of shift in wavelength. Optical factors having a particularly high error sensitivity are the rotation of the diffraction grating 4 in the dispersion direction and the positional misalignment of the lens 3 and the sensor 5 in the dispersion direction. In any of the factors, as the pixel number is larger, in other words, as the wavelength is longer, a shift in the wavelength is smaller.

In this embodiment, the emission line (724 nm) of the neon lamp 10 is incident between pixel numbers 38 and 39. Accordingly, in order to correct a shift in wavelength that occurs due to positional misalignment or a change in orientation of these optical elements, it is necessary to perform correction on a pixel number on the short wavelength side by a larger value than the amount of shift in wavelength estimated by the measurement of the emission line of the neon lamp 10.

In the present example, a correction equation is obtained on the assumption that the occurrence of a shift in wavelength over time depends on the rotation of a diffraction grating a that causes the largest amount of shift in wavelength among amounts illustrated in FIG. 5.

Figure 6:
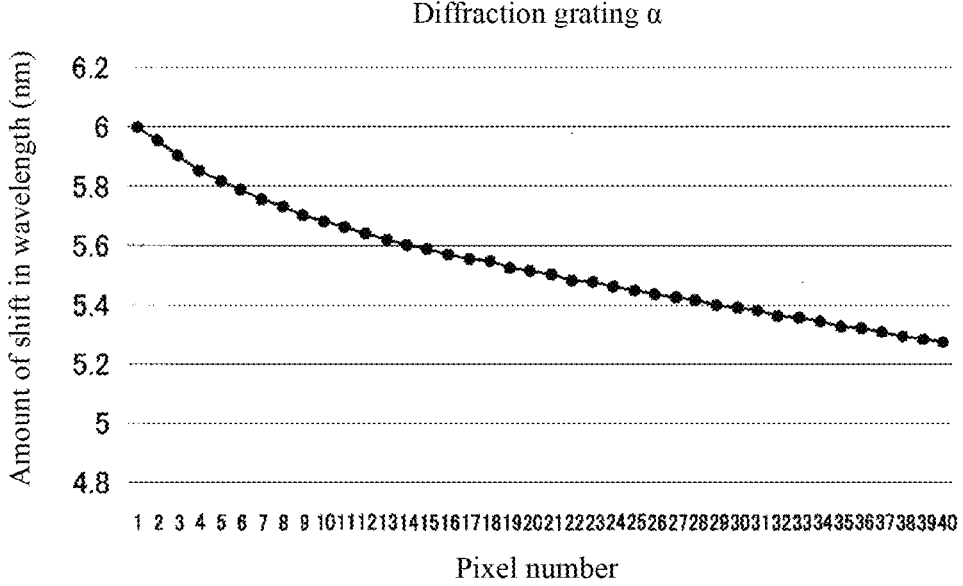
FIG. 6 is an enlarged view of one of the shifts in wavelength due to the optical components illustrated in FIG. 5.

FIG. 6 illustrates a characteristic curve of a shift in wavelength due to a change in inclination of the diffraction grating a. The characteristic curve is extracted from FIG. 5 and enlarged. When the pixel number on the horizontal axis is a parameter x and the amount of shift in wavelength on the vertical axis is y(x), the amount y(x) of shift in wavelength on the characteristic curve illustrated in FIG. 6 is approximated by a cubic function of the pixel number x and is represented by the following Cubic Equation (1).

$$y(x)=-1.52477\times10^{-5}x^3+1.26376\times10^{-3}x^2-4.56637\times10^{-2}x+6.04060 \tag{1}$$

In Equation (1), x is the pixel number, and y(x) is the amount (nm) of shift in wavelength.

For example, when light of a centroid wavelength 720 nm is received by the pixel of the pixel number 38 and light of a centroid wavelength 728 nm is received by the pixel of the pixel number 39, the 724 nm emission line of the neon lamp

10 is imaged just between the pixel numbers 38 and 39. Therefore, a reference amount of shift in emission line wavelength due to a change in the inclination of the diffraction grating a is obtained from Equation (1) by substituting x=38.5 into Equation (1) and is y(38.5)=5.2856 (nm).

When the wavelength shift correction is actually performed using the neon lamp 10, the wavelength of the emission line of the neon lamp 10 is measured, and a measured amount of shift in emission line wavelength that is a shift between the measured value and the emission line wavelength can be calculated. However, there is no known value other than the reference amount of shift in emission line wavelength and the measured amount of shift in emission line wavelength. Therefore, it is necessary to obtain each coefficient of Equation (1) by using the reference amount of shift in emission line wavelength and the measured amount of shift in emission line wavelength of the neon lamp 10. Each coefficient of Equation (1) is a coefficient of an approximate equation when the measured amount of shift in emission line wavelength of the neon lamp 10 is 5.2856 nm equal to the reference amount of shift in emission line wavelength.

The amount of shift in wavelength due to a change in the inclination of the diffraction grating a is substantially proportional to the inclination amount regardless of the wavelength. When the measured amount of shift in emission line wavelength of the neon lamp 10 can be calculated from this, each coefficient of Equation (1) may be made proportional to the measured amount of shift in emission line wavelength of the neon lamp 10. Accordingly, an approximate equation of the amount of shift in wavelength at an arbitrary wavelength is represented by using the following cubic equation.

$$Y(x)=ax^3+bx^2+cx+d \tag{2}$$

In a case where $\Delta\lambda Ne$ (unit: nm) is the measured amount of shift in emission line wavelength of the neon lamp 10, when each coefficient of Equation (2) is set as in the following Equations (3) to (5), it is possible to approximate the amount of shift in wavelength that occurs due to a change in the inclination of the diffraction grating a in each of the pixels of all the pixel numbers.

$$a=-1.52477\times10^{-5}/5.2856\times\Delta\lambda Ne \tag{3}$$

$$b=1.26376\times10^{-3}/5.2856\times\Delta\lambda Ne \tag{4}$$

$$c=-4.56637\times10^{-2}/5.2856\times\Delta\lambda Ne \tag{5}$$

$$d=6.04060/5.2856\times\Delta\lambda Ne \tag{6}$$

In this way, each coefficient of the approximate equation is obtained, and then the amount y(x) of shift in wavelength is obtained with respect to the measured value $\lambda(x)$ of the wavelength measured by the pixel of each pixel number of the sensor 5. Next, by using this amount y(x) of shift in wavelength as a correction amount, a wavelength $\lambda'(x)$ corresponding to each pixel number after correction is obtained by the following Correction Equation (7).

$$\lambda'(x)=\lambda(x)-y(x) \tag{7}$$

As described above, in this embodiment, in the correction of the shift in wavelength, the measured amount of shift in wavelength that is the difference between the measured value obtained by measuring the emission line wavelength of the incident light from the neon lamp 10 for wavelength shift correction and the original emission line wavelength of the neon lamp 10 is calculated. On the other hand, the reference amount of shift in emission line wavelength for the same emission line wavelength as that of the neon lamp 10 is calculated using the cubic polynomial in which a characteristic of a shift in wavelength that occurs in a range of wavelengths of light dispersed by the diffraction grating 4 and received by the sensor 5 is represented using a variable indicating a pixel number. Based on the measured amount of shift in emission line wavelength and the reference amount of shift in emission line wavelength, each coefficient of the polynomial is determined. Then, the wavelength of the incident light is corrected with the wavelength shift correction amount obtained by the polynomial of which each coefficient has been determined.

That is, the characteristic of the wavelength shift occurring in the range of wavelengths of light dispersed by the diffraction grating 4 and received by the sensor 5 is represented by the cubic polynomial with the variable indicating the pixel number, and the correction is performed based on this polynomial. Therefore, even in a case where, for example, the neon lamp 10 is used as the light source for wavelength shift correction, it is possible to accurately correct not only a shift in wavelength close to 724 nm, which is the emission line, but also a shift in wavelength in a shorter-wavelength range. Accordingly, it is possible to accurately correct a shift in wavelength over the entire range of wavelengths of light dispersed by the diffraction grating 4 and received by the sensor 5. In addition, since each coefficient of the polynomial is determined by obtaining the measured amount of shift in emission line wavelength and the reference amount of shift in emission line wavelength from one emission line wavelength of the neon lamp 10, the neon lamp 10 or the like having a small number of independent emission line wavelengths can be used as the light source for wavelength shift correction without any problem.

Note that although the shifts in wavelength due to the diffraction grating a have been considered in Correction Example 1 described above, a similar method can be applied to other optical components.

Correction Example 2

Next, another correction example of the shifts in wavelength will be described.

In Correction Example 1, the coefficients a, b, c, and d of Cubic Equation (2) are determined based on the characteristic curve of the shifts in wavelength by the simulation of the optical components, but the characteristic curve can also be determined experimentally.

Figure 7:
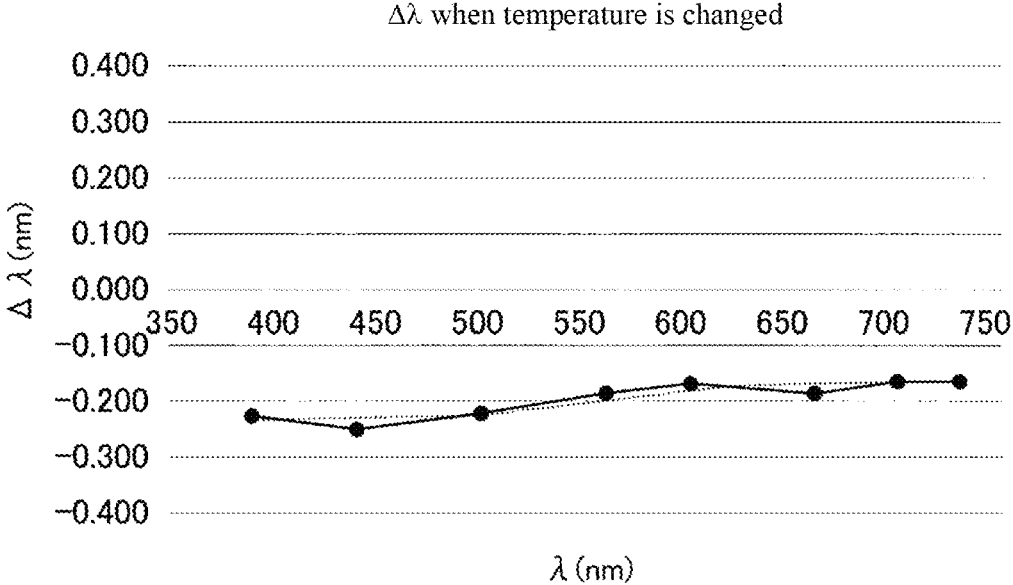
FIG. 7 is a diagram illustrating a result of experimentally measuring the amount of shift in wavelength at each wavelength when a temperature of the optical characteristic measuring apparatus is changed from normal temperature.

FIG. 7 is a graph illustrating the result of experimentally measuring the amount of shift in wavelength at each wavelength when a temperature of the optical characteristic measuring apparatus 1 is changed from normal temperature. This shift in wavelength is caused by positional misalignment or a change in inclination of an optical component due to a change in temperature, and it is considered that the optical component whose position or inclination changes due to the change in temperature is likely to cause a similar change over time. In other words, it is expected that a wavelength shift having the same tendency as that in FIG. 7 occurs even over time. In FIG. 7, the horizontal axis indicates the wavelength, and the vertical axis indicates the amount of shift in the wavelength.

Assuming that the wavelength on the horizontal axis is $\lambda$ and the amount of shift in wavelength on the vertical axis is $y(\lambda)$, the amount $y(\lambda)$ of shift in wavelength on the wavelength shift characteristic curve illustrated in FIG. 7 is approximated by a cubic function of the wavelength $\lambda$ and is represented by the following Cubic Equation (8).

$$y(\lambda)=-7.20085\times10^{-9}\lambda^3+1.19511\times10^{-5}\lambda^2-6.21323\times10^{-3}\lambda+7.98425\times10^{-1} \tag{8}$$

In Equation (8), $\lambda$ is the wavelength (nm), and $y(\lambda)$ is a shift in the wavelength (nm).

When the emission line $\lambda=724$ (nm) of the neon lamp 10 due to a change in temperature during the experiment of FIG. 7 is substituted into Equation (8), the reference amount of shift in emission line wavelength is $y(724)=-0.168$ (nm).

As in Correction Example 1, an approximate equation of the amount of shift in wavelength at an arbitrary wavelength is represented by the following cubic equation.

$$y(\lambda)=a\lambda^3+b\lambda^2+c\lambda+d \tag{9}$$

When $\Delta\lambda$Ne (unit: nm) is a measured amount of shift in emission line wavelength of the neon lamp 10, and each coefficient of Equation (9) is set as follows, a shift in wavelength that occurs due to a change in temperature at an arbitrary wavelength is approximated.

$$a=-7.20085\times10^{-9}/(-0.168)\times\Delta\lambda Ne \tag{10}$$

$$b=1.19511\times10^{-5}/(-0.168)\times\Delta\lambda Ne \tag{11}$$

$$c=-6.21323\times10^{-3}/(-0.168)\times\Delta\lambda Ne \tag{12}$$

$$d=7.98425/(-0.168)\times\Delta\lambda Ne \tag{13}$$

Thus, each coefficient of the approximate equation is obtained, thereafter, the amount $y(\lambda)$ of shift in wavelength is obtained for the measured value $\lambda$ of each wavelength, and a wavelength $\lambda$ for each pixel number after the correction is obtained by the following Correction Equation (14) using the amount $y(\lambda)$ of shift in wavelength as a correction amount.

$$\lambda'=\lambda-y(\lambda) \tag{14}$$

As described above, also in this embodiment, since the wavelength shift correction is performed using the cubic equation in which a characteristic of a wavelength shift occurring in a range of wavelengths of light dispersed by the diffraction grating 4 and received by the sensor 5 is represented using a variable indicating a wavelength, even in a case where the neon lamp 10 is used as the light source for wavelength shift correction, a shift in wavelength in a shorter-wavelength range can be corrected in a similar manner to the correction of a shift in wavelength close to 724 nm, and a shift in wavelength over the entire range of wavelengths of light dispersed by the diffraction grating 4 and received by the sensor 5 can be accurately corrected. In addition, since each coefficient of the polynomial is determined by obtaining the measured amount of shift in emission line wavelength and the reference amount of shift in emission line wavelength from one emission line wavelength of the neon lamp 10, the neon lamp 10 or the like having a small number of independent emission line wavelengths can be used as the light source for wavelength shift correction.

One embodiment of the present invention has been described above, but the present invention is not limited to the above-described embodiment. For example, in Correction Example 1, the pixel number is used as a variable as a parameter relating to the wavelength, but the wavelength may be used as a variable as in Correction Example 2. Further, the parameter relating to the wavelength is not limited to the pixel number.

In addition, although the characteristic of the shift in wavelength is approximated by the cubic equation with the variable indicating the wavelength or the parameter relating to the wavelength, the characteristic may be approximated by a linear equation, a quadratic equation, or a fourth or higher order polynomial according to a characteristic of each component.

Furthermore, although the neon lamp 10 is used as the light source for wavelength shift correction, a light source that emits light including an emission line at at least one wavelength may be used as the light source for wavelength shift correction.

Furthermore, although the case where the neon lamp 10 as the light source for wavelength shift correction is included in the optical characteristic measuring apparatus 1 has been described, the neon lamp 10 may not be included. However, it is desirable that the neon lamp 10 be included because the user can perform the operation for wavelength shift correction without separately preparing the light source for wavelength shift correction.

Although it has been described that the optical characteristic measuring apparatus 1 includes the correcting section 7 and corrects a shift in wavelength in the optical characteristic measuring apparatus 1, the shift in wavelength may be corrected using a correcting apparatus including a personal computer or the like present outside the optical characteristic measuring apparatus 1. In this case, in the correction, the correcting apparatus may acquire a result of measuring the emission line wavelength for the light source for wavelength shift correction from the optical characteristic measuring apparatus 1, calculate a measured amount of shift in emission line wavelength, and determine the coefficients of the polynomial. Furthermore, the calculation of the wavelength shift correction amount using the polynomial of which the coefficients have been determined, and the correction of the measured wavelength may be performed on the correcting apparatus side, or the polynomial of which the coefficients have been determined, may be transmitted to the optical characteristic measuring apparatus 1, and the calculation of the wavelength shift correction amount and the correction may be performed using the received polynomial on the optical characteristic measuring apparatus 1 side.

The polynomial representing a characteristic of a shift in wavelength may be stored in advance in the optical characteristic measuring apparatus 1 or the correcting apparatus or may be acquired from a separate storage location by the optical characteristic measuring apparatus 1 or the correcting apparatus in the correction.

This application claims the benefit of Japanese Patent Application No. 2021-004965, filed Jan. 15, 2021, the disclosure of which is incorporated herein by reference in its entirety.

INDUSTRIAL APPLICABILITY

The present invention can be used as an optical characteristic measuring apparatus that spectrally separates incident light to measure a wavelength, such as a spectral colorimeter or a spectral luminance meter.

REFERENCE SIGNS LIST

1 optical characteristic measuring apparatus
2 entrance slit
3 lens
4 diffraction grating (spectroscopic section)
5 sensor (photoelectric conversion element)
6 wavelength measuring section
7 correcting section
8 display section
10 light source for wavelength shift correction

The invention claimed is:

1. An optical characteristic measuring apparatus comprising:

a diffraction grating to disperse incident light according to a wavelength;

a photoelectric conversion sensor including a plurality of pixels arranged in a dispersion direction in which the incident light is dispersed by the diffraction grating, the pixels to receive the dispersed incident light; and a hardware processor to:

measure the wavelength of the incident light and a light amount of the incident light based on a signal from each of the pixels of the photoelectric conversion sensor;

in correction of a shift in wavelength, calculate, as a measured amount of shift in emission line wavelength, a difference between a measured value obtained when the hardware processor measures the emission line wavelength of the incident light from a light source for wavelength shift correction that emits the light including an emission line at at least one wavelength in a range of wavelengths into which the light can be dispersed by the diffraction grating and an original emission line wavelength of the light source for correction;

determine each coefficient of a polynomial based on a reference amount of shift in emission line wavelength for the same emission line wavelength as the emission line wavelength of the light source for wavelength shift correction and the measured amount of shift in emission line wavelength calculated by the hardware processor, the polynomial being a first or higher order polynomial that has a variable indicating the wavelength or a parameter relating to the wavelength and represents a characteristic of a shift in wavelength that occurs in the range of wavelengths into which the light can be dispersed by the diffraction grating, the reference amount of shift in emission line wavelength being obtained using the polynomial;

obtain a wavelength shift correction amount by the polynomial, each coefficient of which is determined by the hardware processor; and calibrate the optical characteristic measuring apparatus by correcting the wavelength of the incident light measured by the hardware processor with the wavelength shift correction amount, wherein the polynomial is an equation made based on an amount of shift in wavelength which occurs when a position or inclination of an optical component and the photoelectric conversion sensor changes, the amount of shift in wavelength is obtained by an optical simulation or obtained experimentally as the polynomial and stored-before measuring the emission line wavelength of the light source for wavelength shift correction, and each coefficient of the polynomial determined by the hardware processor is represented by a linear function of the measured amount of shift in emission line wavelength.

2. The optical characteristic measuring apparatus according to claim 1, wherein the polynomial is a cubic polynomial.

3. The optical characteristic measuring apparatus according to claim 1, further comprising the light source for wavelength shift correction.

4. A wavelength shift correcting apparatus comprising:
a hardware processor to:

in correction of a shift in wavelength, obtain a measured value from an optical characteristic measuring apparatus including: a diffraction grating to disperse incident light according to a wavelength; a photoelectric conversion sensor including a plurality of pixels arranged in a dispersion direction in which the incident light is dispersed by the diffraction grating, the pixels to receive the dispersed incident light; and a hardware processor of the optical characteristic measuring apparatus to measure the wavelength of the incident light and a light amount of the incident light based on a signal from each of the pixels of the photoelectric conversion sensor, the measured value being obtained when the hardware processor of the optical characteristic measuring apparatus measures an emission line wavelength of the incident light from a light source for wavelength shift correction that emits the light including an emission line at at least one wavelength in a range of wavelengths into which the light can be dispersed by the diffraction grating;

calculate, as a measured amount of shift in emission line wavelength, a difference between the measured value obtained by the hardware processor of the wavelength shift correcting apparatus and an original emission line wavelength of the light source for correction; and determine each coefficient of a polynomial based on a reference amount of shift in emission line wavelength for the same emission line wavelength as the emission line wavelength of the light source for wavelength shift correction and the measured amount of shift in emission line wavelength calculated by the hardware processor of the wavelength shift correcting apparatus, the polynomial being a first or higher order polynomial that has a variable indicating the wavelength or a parameter relating to the wavelength and represents a characteristic of a shift in wavelength that occurs in the range of wavelengths into which the light can be dispersed by the diffraction grating, the reference amount of shift in emission line wavelength being obtained using the polynomial, wherein the wavelength of the incident light measured by the hardware processor of the optical characteristic measuring apparatus is obtained by the polynomial, each coefficient of which is determined by the hardware processor of the wavelength shift correcting apparatus, the optical characteristic measuring apparatus is calibrated by correcting the wavelength of the incident light measured by the hardware processor of the wavelength shift correcting apparatus with the wavelength shift correction amount, the polynomial is an equation made based on an amount of shift in wavelength which occurs when a position or inclination of an optical component and the photoelectric conversion sensor changes, the amount of shift in wavelength is obtained by an optical simulation or obtained experimentally as the polynomial and stored before measuring the emission line wavelength of the light source for wavelength shift correction, and each coefficient of the polynomial determined by the hardware processor is represented by a linear function of the measured amount of shift in emission line wavelength.

5. The wavelength shift correcting apparatus according to claim 4, wherein the polynomial is a cubic polynomial.

6. A wavelength shift correction method comprising:

measuring a wavelength and a light amount of incident light based on signals from a plurality of pixels of a photoelectric conversion sensor, the pixels being arranged in a dispersion direction in which the incident light is dispersed by a diffraction grating, the pixels to receive the dispersed incident light;

in correction of a shift in wavelength, calculating, as a measured amount of shift in emission line wavelength, a difference between a measured value obtained when the emission line wavelength of the incident light from a light source for wavelength shift correction that emits the light including an emission line at at least one wavelength in a range of wavelengths into which the light can be dispersed by the diffraction grating is measured and an original emission line wavelength of the light source for correction;

determining each coefficient of a polynomial based on a reference amount of shift in emission line wavelength for the same emission line wavelength as the emission line wavelength of the light source for wavelength shift correction and the measured amount of shift in emission line wavelength that is calculated, the polynomial being a first or higher order polynomial that has a variable indicating the wavelength or a parameter relating to the wavelength and represents a characteristic of a shift in wavelength that occurs in the range of wavelengths into which the light can be dispersed by the diffraction grating, the reference amount of shift in emission line wavelength being obtained using the polynomial; and obtaining a wavelength shift correction amount by the polynomial, each coefficient of which is determined in the coefficient of which is determined; and calibrating the optical characteristic measuring apparatus by correcting the wavelength of the incident light measured by the hardware processor with the wavelength shift correction amount, wherein the polynomial is an equation made based on an amount of shift in wavelength which occurs when a position or inclination of an optical component and the photoelectric conversion sensor changes, the amount of shift in wavelength is obtained by an optical simulation or obtained experimentally as the polynomial and stored before measuring the emission line wavelength of the light source for wavelength shift correction, and each coefficient of the polynomial determined by the hardware processor is represented by a linear function of the measured amount of shift in emission line wavelength.

7. The wavelength shift correction method according to claim 6, wherein the polynomial is a cubic polynomial.

8. A non-transitory computer-readable recording medium storing a program for causing a computer to execute:

in correction of a shift in wavelength, obtaining a measured value from an optical characteristic measuring apparatus including: a diffraction grating to disperse incident light according to a wavelength, a photoelectric conversion sensor including a plurality of pixels arranged in a dispersion direction in which the incident light is dispersed by the diffraction grating, the pixels to receive the dispersed incident light, and a hardware processor to measure the wavelength of the incident light and a light amount of the incident light based on a signal from each of the pixels of the photoelectric conversion sensor the measured value being obtained when the hardware processor measures an emission line wavelength of the incident light from a light source for wavelength shift correction that emits the light including an emission line at at least one wavelength in a range of wavelengths into which the light can be dispersed by the diffraction grating;

calculating, as a measured amount of shift in emission line wavelength, a difference between the measured value that is obtained and an original emission line wavelength of the correction light source; and determining each coefficient of a polynomial based on a reference amount of shift in emission line wavelength for the same emission line wavelength as the emission line wavelength of the light source for wavelength shift correction and the measured amount of shift in emission line wavelength that is calculated, the polynomial being a first or higher order polynomial that has a variable indicating the wavelength or a parameter relating to the wavelength and represents a characteristic of a shift in wavelength that occurs in the range of wavelengths into which the light can be dispersed by the diffraction grating, the reference amount of shift in emission line wavelength being obtained using the polynomial, wherein the wavelength of the incident light measured by the hardware processor of the optical characteristic measuring apparatus is obtained by the polynomial, each coefficient of which is determined, the polynomial is an equation made based on an amount of shift in wavelength which occurs when a position or inclination of an optical component and the photoelectric conversion sensor changes, the amount of shift in wavelength is obtained by an optical simulation or obtained experimentally as the polynomial and stored before measuring the emission line wavelength of the light source for wavelength shift correction, and each coefficient of the polynomial determined by the hardware processor is represented by a linear function of the measured amount of shift in emission line wavelength.

9. The non-transitory computer-readable recording medium storing the program according to claim 8, wherein the polynomial is a cubic polynomial.

\* \* \* \* \*